(12) United States Patent
Noble et al.

(10) Patent No.: US 7,145,280 B2
(45) Date of Patent: Dec. 5, 2006

(54) STATOR FOR A DYNAMOELECTRIC MACHINE HAVING A SPLIT FERROMAGNETIC CORE

(75) Inventors: Ernest John Noble, Auckland (NZ); David James Howell, Auckland (NZ)

(73) Assignee: Wellington Drive Technologies Limited, Auckland (NZ)

( * ) Notice: Subject to any disclaimer, the term of this patent is extended or adjusted under 35 U.S.C. 154(b) by 117 days.

(21) Appl. No.: 10/258,136

(22) PCT Filed: Mar. 7, 2001

(86) PCT No.: PCT/NZ01/00035

§ 371 (c)(1),
(2), (4) Date: Feb. 13, 2003

(87) PCT Pub. No.: WO01/80399

PCT Pub. Date: Oct. 25, 2001

(65) Prior Publication Data

US 2004/0036374 A1    Feb. 26, 2004

(30) Foreign Application Priority Data

Apr. 19, 2000    (NZ) .................................... 504055

(51) Int. Cl.
*H02K 3/46* (2006.01)
*H02K 3/52* (2006.01)
*H02K 1/12* (2006.01)
*H02K 7/17* (2006.01)
*H02K 1/06* (2006.01)

(52) U.S. Cl. .............. 310/254; 310/268; 310/259; 310/218; 310/216; 310/208; 310/180; 310/164; 29/606; 29/596

(58) Field of Classification Search ............. 310/180, 310/208, 254, 164, 216, 218, 259, 268; 29/596, 29/606; 290/606, 596
See application file for complete search history.

(56) References Cited

U.S. PATENT DOCUMENTS

| 469,080 | A | | 2/1892 | Deprez ................... 310/267 |
| 3,800,172 | A | * | 3/1974 | Artin et al. ................ 310/50 |
| 4,103,197 | A | | 7/1978 | Ikegami et al. ............ 310/267 |
| 4,217,508 | A | | 8/1980 | Uzuka ....................... 310/46 |
| 4,514,655 | A | * | 4/1985 | Hosoya ..................... 310/218 |
| 4,547,713 | A | * | 10/1985 | Langley et al. ............ 318/254 |
| 4,563,606 | A | | 1/1986 | Fukasawa et al. ......... 310/208 |

(Continued)

FOREIGN PATENT DOCUMENTS

DE                45079        12/1886

(Continued)

*Primary Examiner*—Karl Tamai
*Assistant Examiner*—Pedro J. Cuevas
(74) *Attorney, Agent, or Firm*—Young & Thompson

(57) ABSTRACT

A method and apparatus for production of stator windings for dynamoelectric mechines of different configurations is provided. The windings are preferably formed on a bobbin (10) or similar article, which may then be transferred onto an appropriate carrier such as a ferromagnetic core (24). The core (24) may be provided as a substantial linear article and then be bent into an appropriate shape, so that the assembly may be provided as the stator of a dynamoelectric machine. In this configuration, only a portion of each winding will face the magnetic poles of the rotor and thus be operative, as the return path of the windings will not be used. However, the invention as disclosed also shows it is possible to build a drum rotor (39) with both external and internal rotors in order to make use of both portions of the windings on the ferromagnetic core (24).

15 Claims, 7 Drawing Sheets

B-B

U.S. PATENT DOCUMENTS

| | | | | |
|---|---|---|---|---|
| 4,629,918 | A * | 12/1986 | Amendola et al. | 310/65 |
| 4,724,368 | A | 2/1988 | Andrews | 318/439 |
| 4,758,751 | A * | 7/1988 | Hosoya et al. | 310/41 |
| 4,761,960 | A * | 8/1988 | Higham et al. | 62/6 |
| 4,818,911 | A * | 4/1989 | Taguchi et al. | 310/259 |
| 4,958,099 | A * | 9/1990 | Chigira et al. | 310/254 |
| 5,001,379 | A * | 3/1991 | Katayama | 310/194 |
| 5,044,897 | A | 9/1991 | Dorman | 417/423.7 |
| 5,172,021 | A | 12/1992 | Takahashi et al. | 310/90.5 |
| 5,275,141 | A * | 1/1994 | Tsunoda et al. | 123/399 |
| 5,304,883 | A | 4/1994 | Denk | 310/180 |
| 5,334,898 | A * | 8/1994 | Skybyk | 310/268 |
| 5,334,899 | A | 8/1994 | Skybyk | 310/268 |
| 5,457,873 | A * | 10/1995 | Cattaneo | 29/606 |
| 5,515,075 | A * | 5/1996 | Nakagiri et al. | 345/111 |
| 5,526,016 | A * | 6/1996 | Nakagiri et al. | 345/111 |
| 5,592,731 | A * | 1/1997 | Huang et al. | 29/596 |
| 5,627,424 | A * | 5/1997 | Steiner | 310/258 |
| 5,627,563 | A * | 5/1997 | Nakagiri et al. | 345/111 |
| 5,729,071 | A * | 3/1998 | Steiner | 310/258 |
| 5,859,486 | A * | 1/1999 | Nakahara et al. | 310/254 |
| 5,986,377 | A * | 11/1999 | Yamada et al. | 310/216 |
| RE36,545 | E * | 2/2000 | Steiner | 310/258 |
| 6,118,203 | A * | 9/2000 | Hansen | 310/180 |
| 6,121,697 | A * | 9/2000 | Soultanian | 310/29 |
| 6,121,711 | A * | 9/2000 | Nakahara et al. | 310/254 |
| 6,167,610 | B1 * | 1/2001 | Nakahara et al. | 29/596 |
| 6,211,595 | B1 * | 4/2001 | Nose | 310/216 |
| 6,853,110 | B1 * | 2/2005 | Durham et al. | 310/254 |
| 6,856,064 | B1 * | 2/2005 | Masumoto et al. | 310/216 |
| 6,919,665 | B1 * | 7/2005 | Murakami et al. | 310/216 |
| 6,936,949 | B1 * | 8/2005 | Akutsu et al. | 310/218 |
| 6,956,307 | B1 * | 10/2005 | Engquist et al. | 310/44 |
| 6,983,529 | B1 * | 1/2006 | Ortt et al. | 29/596 |
| 7,007,371 | B1 * | 3/2006 | Didier et al. | 29/592.1 |

FOREIGN PATENT DOCUMENTS

| | | | | |
|---|---|---|---|---|
| JP | 01148039 | A | | 6/1989 |
| JP | 05056589 | A | | 3/1993 |
| JP | 07184333 | A | * | 7/1995 |
| JP | 08172739 | A | * | 7/1996 |
| JP | 08322179 | A | * | 12/1996 |
| JP | A 10-201145 | | | 7/1998 |
| JP | A 11-187600 | | | 7/1999 |
| JP | 2001045692 | A | * | 2/2001 |
| SU | 1241-350 | A | | 6/1986 |

\* cited by examiner

A-A

A-A

B-B

A-A

A-A

STATOR FOR A DYNAMOELECTRIC MACHINE HAVING A SPLIT FERROMAGNETIC CORE

FIELD OF THE INVENTION

This invention relates to the production of stator windings for dynamoelectric machines. It has application to the design and construction of stators, and hence machines designed as rotary dynamoelectric machines, and has particular application to the design and construction of drum motors, and disk motors.

BACKGROUND

Existing dynamoelectric machines, in particular DC electric motors require complex winding machines to create the stator windings on the stator. Often the stator has a special shape which has to be accommodated by the winding machine or winding technique. The windings are typically wound into slots in a steel stator, or wound as loops on top of a back-iron support. In the case of "slot-less" disk or drum motors the winding loops appear to approximate to a "square" geometry with the two end portions wasting copper wire and creating unusable magnetic flux. In each case, all positions of the coils sit on or in the surface of a disk or drum.

OBJECT

It is an object of this invention to provide an improved method of producing a stator winding for a dynamoelectric machine or one which will at least provide the public with a useful choice.

STATEMENT OF INVENTION

In one aspect the invention provides a stator for a dynamoelectric machine comprising a ferromagnetic support having a primary face and a secondary face, a plurality of winding coils on said ferromagnetic support, wherein each coil has a primary portion and a secondary portion magnetically shielded from one another by said ferromagnetic support.

Preferably each winding will have a primary portion on/in/over the primary face of the ferromagnetic support and a secondary portion on/in/over the secondary face of the ferromagnetic support.

In a second aspect the invention provides a stator winding for a dynamoelectric machine consisting of a plurality of winding coils arranged on a common curved axis (whether this is a drum or disk based machine) wherein the common axis is in the direction of the force generated by the windings, and having a ferromagnetic structure passing through the centre of the coils.

Preferably the stator winding is constructed by producing a required winding layout on a former and transferring the windings so produced onto a central ferromagnetic support which makes up or forms part of the stator.

The ferromagnetic support can be made from a single piece or from a number of portions or segments.

Preferably the ferromagnetic support is in the form of a curved elongate strip, more particularly having a rectangular or substantially rectangular cross section. Preferably the winding layout is threaded onto the elongate strip.

In the case of a drum motor, the ferromagnetic support can be pre-bent into an almost complete circular shape leaving a gap for the insertion of the windings (as described below) then joined together to form a complete ring to support and hold the windings in place.

Preferably the former is made up of a plurality of annular bobbins which can be threaded onto the ferromagnetic support.

Preferably the ferromagnetic support consists of a single segment describing the full circle of a rotary machine. Alternatively it may consist of a number of linear or arc segments which may be joined together end to end either before or after the windings are threaded onto them.

In another aspect the invention provides a method of producing a stator winding by winding coils or loops about an elongate curved ferromagnetic support so that the winding portions on one side of the support are shielded from, the winding portions on the other side of the support.

In another aspect the invention provides a method of producing a stator winding for a dynamoelectric machine by producing a required winding layout on a former and transferring the windings so produced onto a central ferromagnetic support which makes up or forms part of the stator.

Preferably the ferromagnetic support is in the form of a curved elongate strip, more particularly having a rectangular or substantially rectangular cross section. Preferably the winding layout is threaded onto the elongate strip.

In another aspect the invention provides a plurality of bobbins suitable for supporting a stator winding, each bobbin having a centre body, supporting a pair of end flanges, the centre body having an aperture therethrough to enable each of the bobbins to be threaded onto an elongate ferromagnetic support. Preferably the centre body has a substantially rectangular cross-section. More preferably the aperture is of substantially rectangular cross-section.

Preferably each bobbin is moulded from a plastics material.

Preferably each bobbin has a major axis which is substantially greater than its minor axis.

In those cases where the bobbins will be threaded onto a ring-like annular support for use in a disk or drum motor, the appropriate external and internal surfaces of the centre body may be curved (for example this can be formed in the moulding process) in order to accommodate the curvature of the ferromagnetic support. The gap or split in the ferromagnetic support is preferably made at an angle such as to cover a whole pole. This keeps the cogging effects of the gap down to a level compatible with low noise.

In another aspect the invention provides a stator for a dynamoelectric machine, the stator having a curved elongate ferromagnetic core, the core having a substantially rectangular cross section, a plurality of windings supported on the core, the windings forming loops about the core, so that the portion of the windings on one side of the core are shielded from the portion of the windings on the other side of the core.

In another aspect the invention provides a dynamoelectric machine having a stator as described in the preceding paragraph, and a moveable portion, the moveable portion supporting magnetic poles, wherein the ferromagnetic core of the stator is disposed so that at least one long face of the core, and hence the equivalent length of conductor winding of the core faces towards an adjacent magnetic pole of the moveable portion of the machine.

This arrangement will become apparent from the following description and in particular the drawings illustrating various examples of this invention.

In each case the windings are supported on the ferromagnetic core, and in the case of, say, a drum motor with an external rotor, only that portion of the winding facing the magnetic poles on the rotor, will be operative, as the return path of the windings on the other side of the ferromagnetic core will be shielded by the core, and the flux associated with the return path of the windings will not be used. However, as will become apparent from some of the drawings, it will be possible to build a drum motor with both external and internal rotors in order to make use of both portions of the windings on the "long" faces of the ferromagnetic core.

In summary, this results in the coils being oriented at 90° to the conventional layout.

BRIEF DESCRIPTION OF DRAWINGS

These and other aspects of this invention, which should be considered in all its novel aspects, will become apparent from the following description, which is given by way of example only, with reference to the accompanying drawings, in which.

DETAILED DESCRIPTION OF THE PREFERRED EMBODIMENTS

EXAMPLE 1

Bobbins

In its most preferred form the invention makes use of a plurality of bobbins, to allow the various winding phases to be wound onto a former supporting the bobbins, and then transferring the bobbins onto the appropriate ferromagnetic core of the stator, of the shape required for a particular dynamoelectric machine. However it is possible to produce the windings without using bobbins, and to move the windings from the former onto the core, or alternatively to wind directly onto the core. Nevertheless bobbins do provide a useful mechanism for both creating the windings and holding the windings on the stator in the finished machine.

Figure 2:
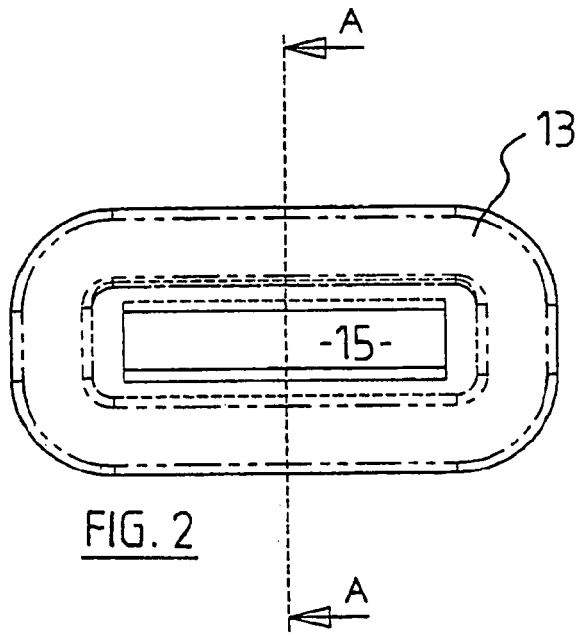
FIG. 2 illustrates an end elevation of the bobbin of FIG. 1.
Figure 3:
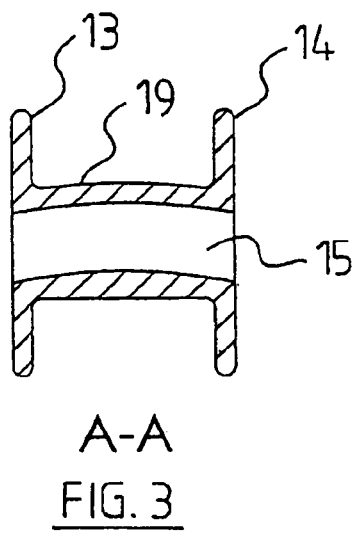
FIG. 3 illustrates a cross sectional view on line A—A of FIG. 2. This bobbin is shaped for use in a drum type stator assembly.
Figure 1:
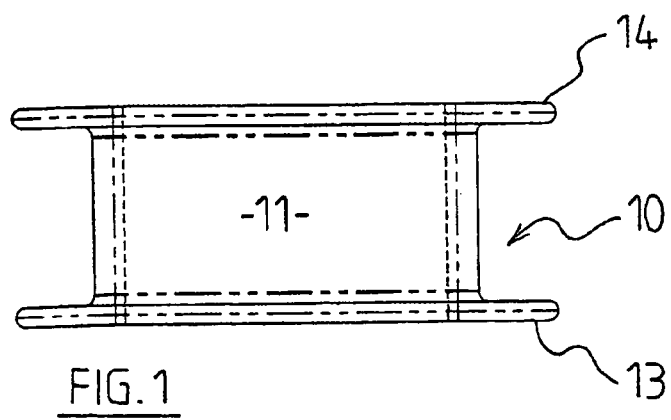
FIG. 1 illustrates a plan view of a substantially rectangular bobbin.

FIGS. 1 to 3 show substantially rectangular bobbins, each bobbin 10 having a substantially rectangular shape, having a centre body 11, and side flanges 13 and 14. There is a central aperture 15 passing through the flanges and the centre body, and this central aperture is also substantially rectangular when viewed end on as in FIG. 2. The bobbin 10 shown in FIGS. 1 to 3 is a bobbin especially shaped for use with a drum type stator assembly, and hence the internal and external surfaces of the centre body are curved as shown by the surface 19 in FIG. 3. This will become more apparent from FIGS. 4–7.

EXAMPLE 2

Drum Type Stator Assembly

FIGS. 4–7 show the use of the bobbins 10, threaded onto a split ring ferromagnetic core. This ferromagnetic core 24 is preferably made of magnetically soft iron, and is also preferably of rectangular cross section being only slightly smaller than the cross sectional area of the aperture 15 so that the bobbins 10 can be threaded onto this core. The windings themselves are not shown in FIGS. 4–7 in order to show the layout of the bobbins. In practice the windings would be created on the bobbins before they were threaded onto the core.

Figure 4:
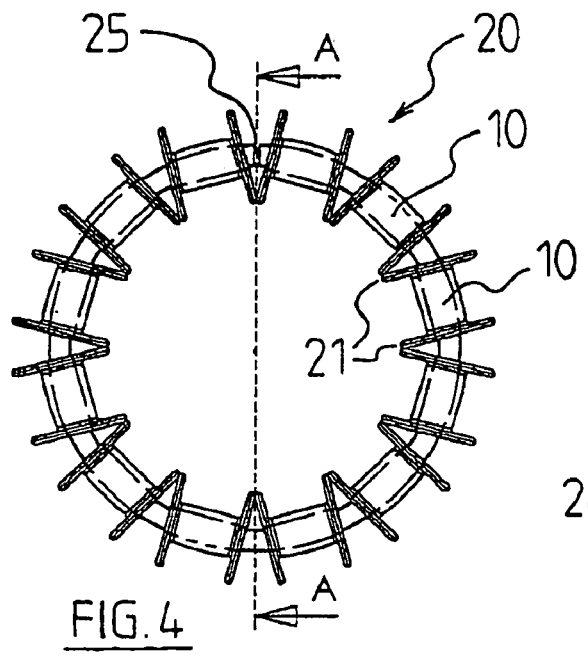
FIG. 4 illustrates a top plan view of a drum type stator assembly (without the windings).
Figure 5:
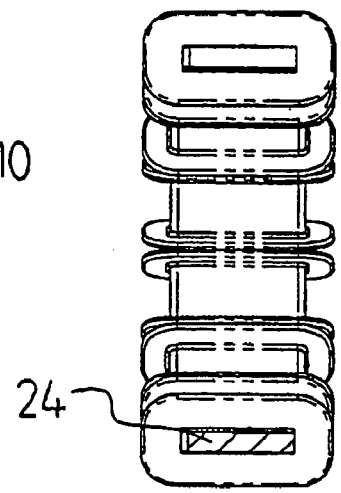
FIG. 5 is a cross sectional view on line A—A of FIG. 4.
Figure 6:
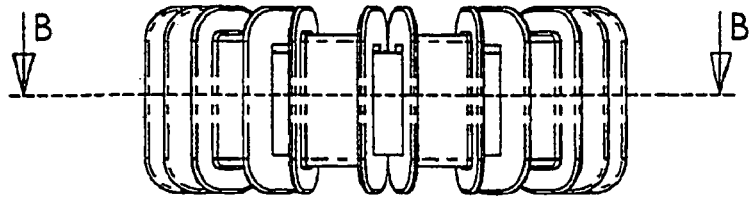
FIG. 6 is a front elevation of the stator assembly of FIG. 4.
Figure 7:
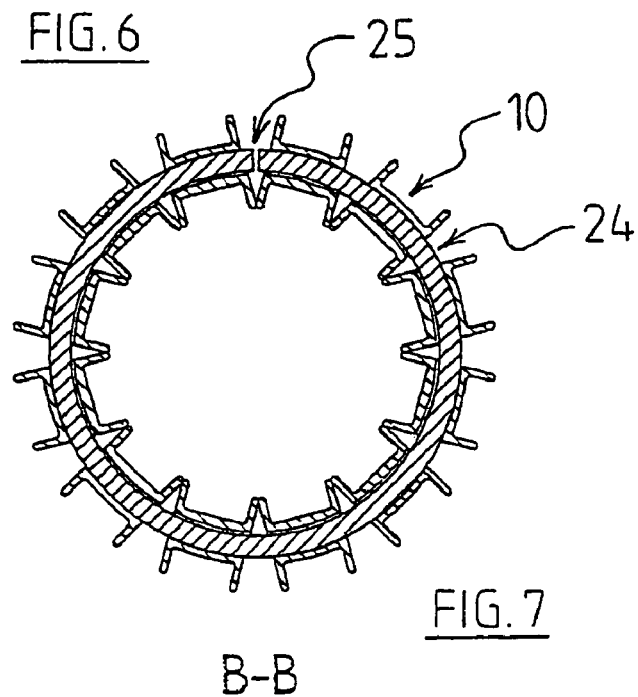
FIG. 7 is a cross sectional view on line B—B of the FIG. 6.

Sufficient bobbins are threaded onto the core as shown in FIG. 4, that the radially internal edges of the flanges 13 and 14 of adjacent bobbins 10 will touch at points 21.

The split ring core 24 has a gap or split at 25, which normally would be pulled open to enable the bobbins to be threaded onto the core, and then pushed together, and perhaps joined together by specially shaping the ends of the core such that it latches together, or by suitable fastening means to ensure that the core forms an almost continuous ring, so that the windings on the bobbins on the core then approximate to the windings on a circular core.

Figure 8:
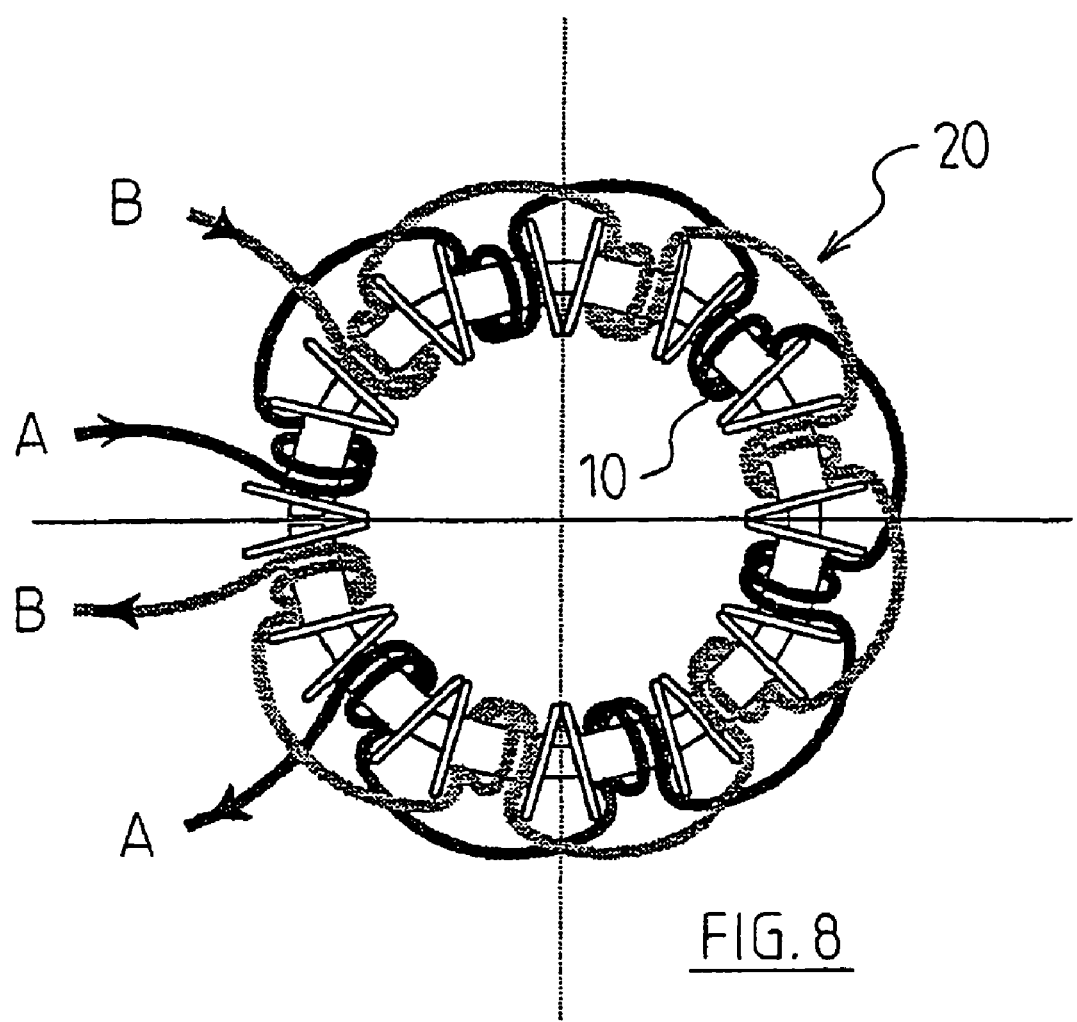
FIG. 8 shows a winding diagram, with windings A and B superimposed on the bobbins of FIG. 4.

Turning now to FIG. 8, a two phase winding made up of windings A and B are shown by two different shadings. Winding A is darker than winding B.

The plurality of bobbins 10 are placed on a linear former, it could be a flat strip of steel, wood, or other solid material, or even a block section, and presented to winding machine. In its simplest form the former can rotate with respect to spools of wire so that the wire can be wound onto the bobbins in a predetermined array, by the former rotating about its own axis and then indexed linearly with respect to the position of the spools of wire.

Alternatively the spools of wire can be made to spin around a stationary former in the required pattern.

Once the windings have been produced on the bobbins held on the former, the bobbins with associated windings can then be threaded onto the open split ferromagnetic core 24, and the core pushed together to form a substantially closed core with the windings present on the bobbins as shown in FIG. 8.

EXAMPLE 3

Drum Motor with an External Rotor

Figure 9:
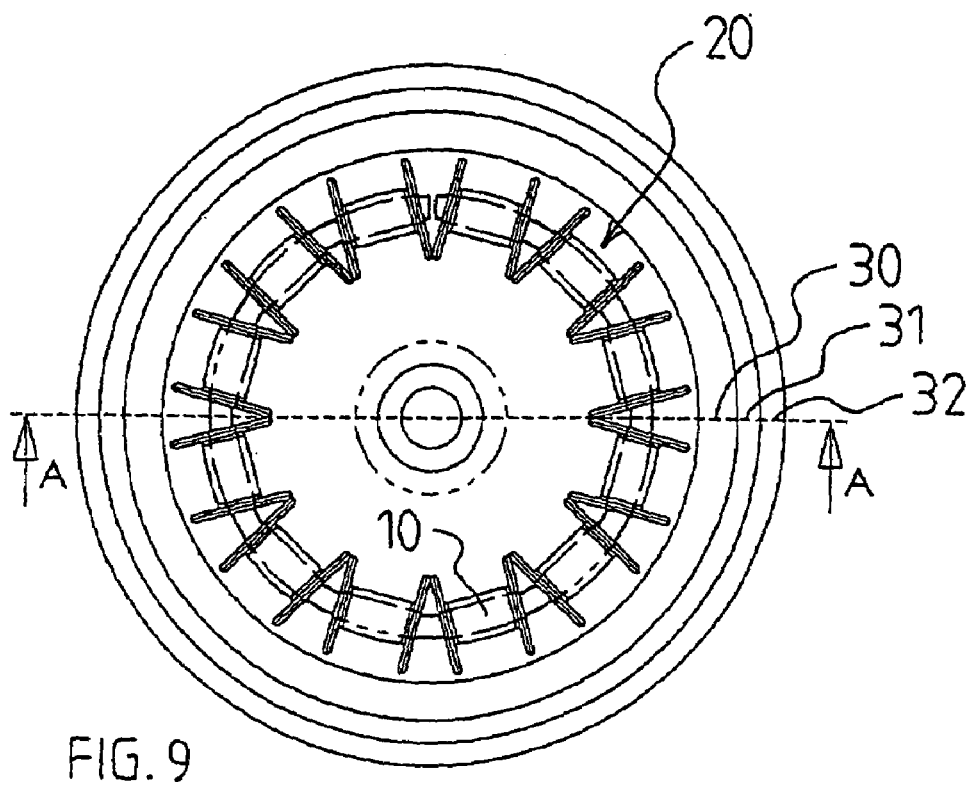
FIG. 9 is a plan view of a drum motor with an external rotor.
Figure 10:
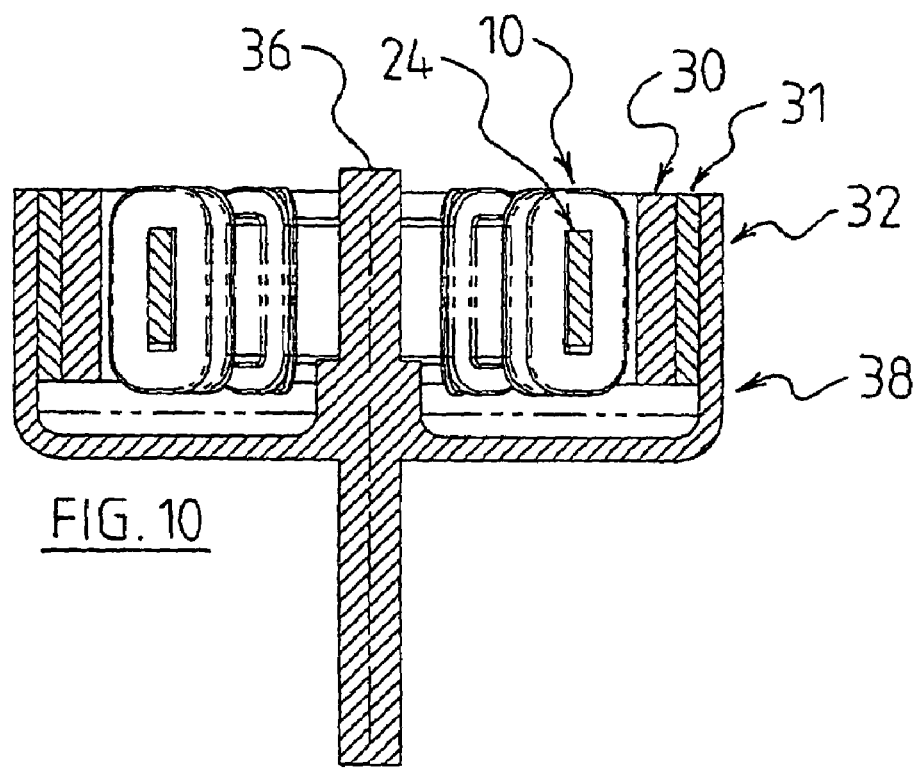
FIG. 10 shows a cross sectional view on line A—A of FIG. 9.
Figure 11:
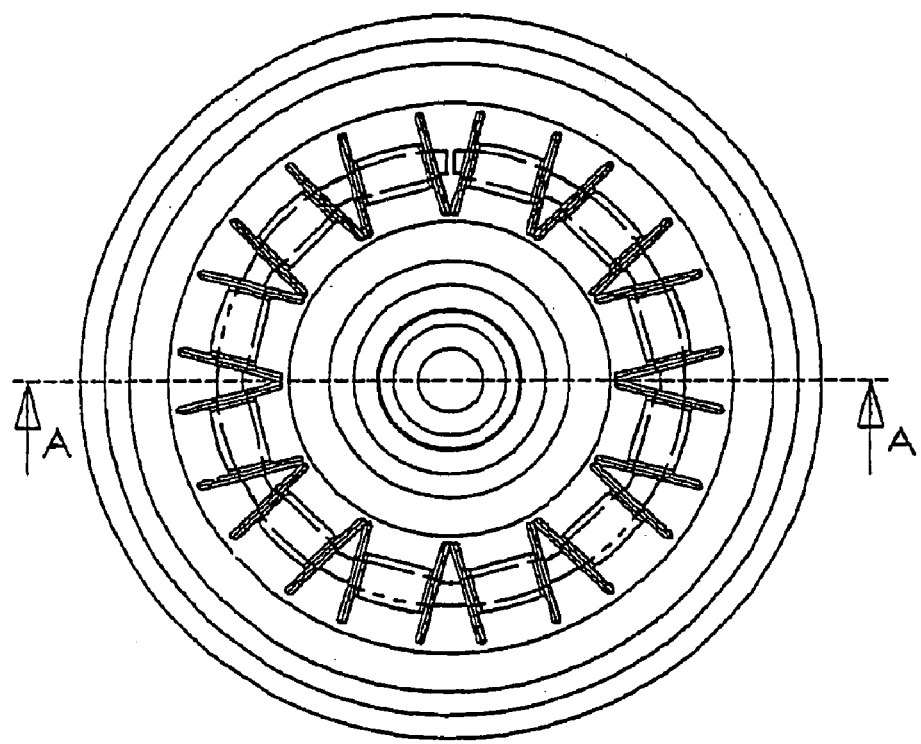
FIG. 11 shows a plan view of a drum motor with both external and internal rotors.
Figure 12:
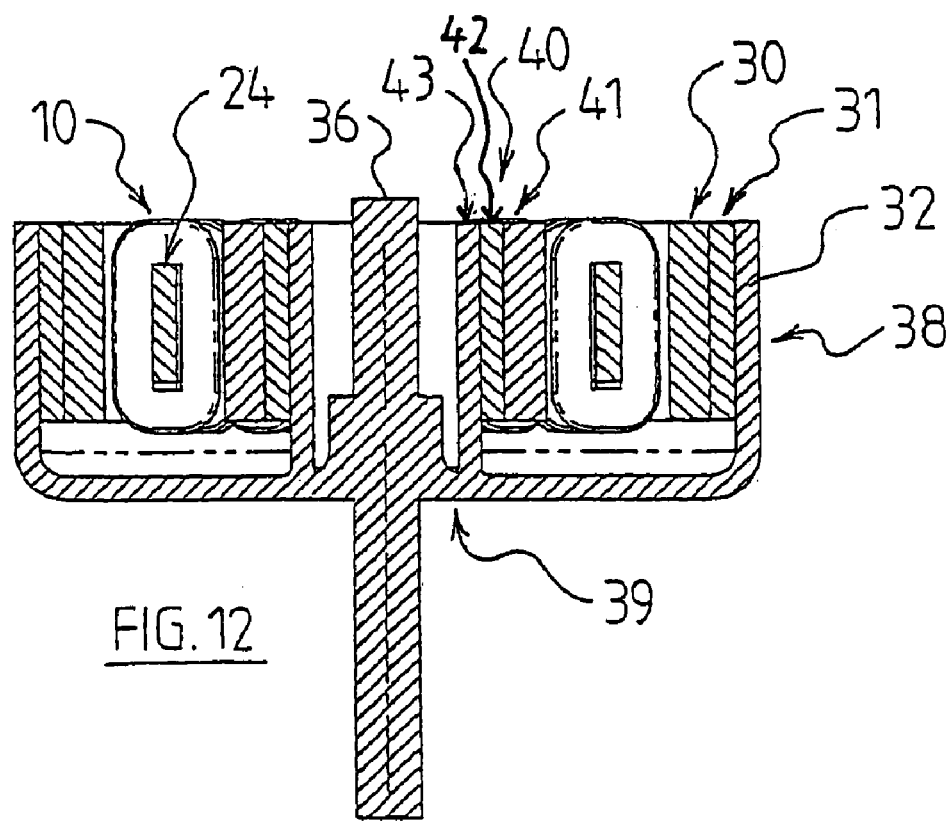
FIG. 12 is a cross sectional view on line A—A of the drum motor of FIG. 11.

The stator 20 of FIGS. 4–8 can be used with the drum motor of FIGS. 9 and 10. In this arrangement the stator configuration made up of the stator ferromagnetic core (stator back iron) supports the bobbins 10 in the array shown in FIG. 9, and these stator windings are surrounded by an external rotor 38 supporting permanent magnets 30 (the north-south magnetic configuration and pole number have not been shown) the magnets being attached to and supported by an external magnetic back iron ring 31, which is in turn situated within and supported by a rotor shell 32. The rotor shell may be formed of any suitable material, for example a plastics material may be used to create an entire external rotor 38.

EXAMPLE 4

A Drum Motor with Both External and Internal Rotors

This is similar to the motor of FIGS. 9 and 10. It also makes use of the stator assembly of FIGS. 4–8. In this case the entire rotor assembly 39 is made up of the external rotor portion 38 and the internal rotor portion 40 situated on either side of the ferromagnetic core 24 which in turn supports the bobbins 10.

The internal rotor also has magnets 41 facing towards the "radially interior" face of the bobbins 10, and the magnets are supported on an appropriate back iron ring 42, which is conveniently situated within an internal rotor shell 43 formed of plastics, can be moulded intricately with the external rotor shell 32 and centre portion 36.

EXAMPLE 5

Disk Motor with Single Rotor

Figure 14:
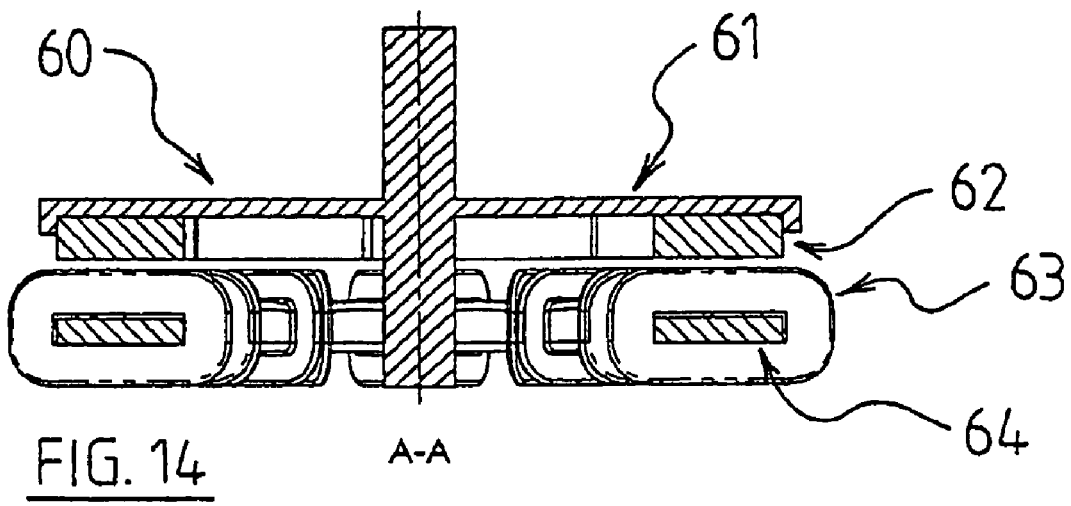
FIG. 14 is a cross sectional view on line A—A of FIG. 13.

In this configuration (shown in FIGS. 13 and 14), the disk motor 60 has a rotor shell 61, preferably formed of steel supporting a plurality of permanent magnetic poles 62 on the underside of disk 61. The stator is made up of a plurality of bobbins 63 supported on a ferromagnetic core 64 also of substantially rectangular cross section, although in this case with the long axis of a rectangle situated in the plane of the stator as shown in FIG. 14. This ferromagnetic core 64 is also in the form of a split ring, similar to that of FIG. 7, although of different orientation, so that the split is shown at numeral 65 in FIG. 13. Also in this case the bobbins have the short sides of the centre body (internal and external) curved, in order to accommodate the split ferromagnetic ring 64.

Figure 13:
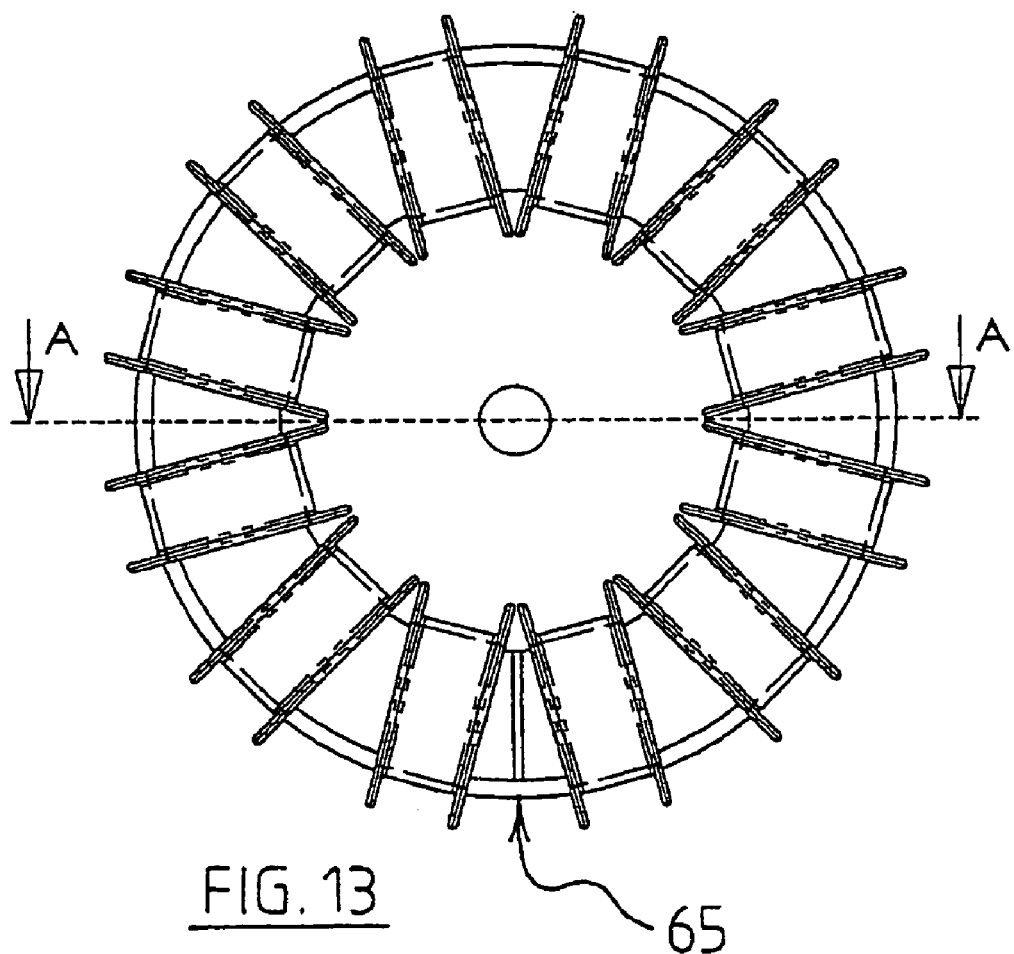
FIG. 13 is a top plan view of a disk motor with a single rotor.

In a similar fashion, the bobbins can be placed on a straight former, the windings produced on the bobbins, and the bobbins and windings then threaded onto the split ring, which can then be pushed into the closed position as shown in FIG. 13.

EXAMPLE 7

Stator for Drum Motor (without Bobbins)

Figure 15:
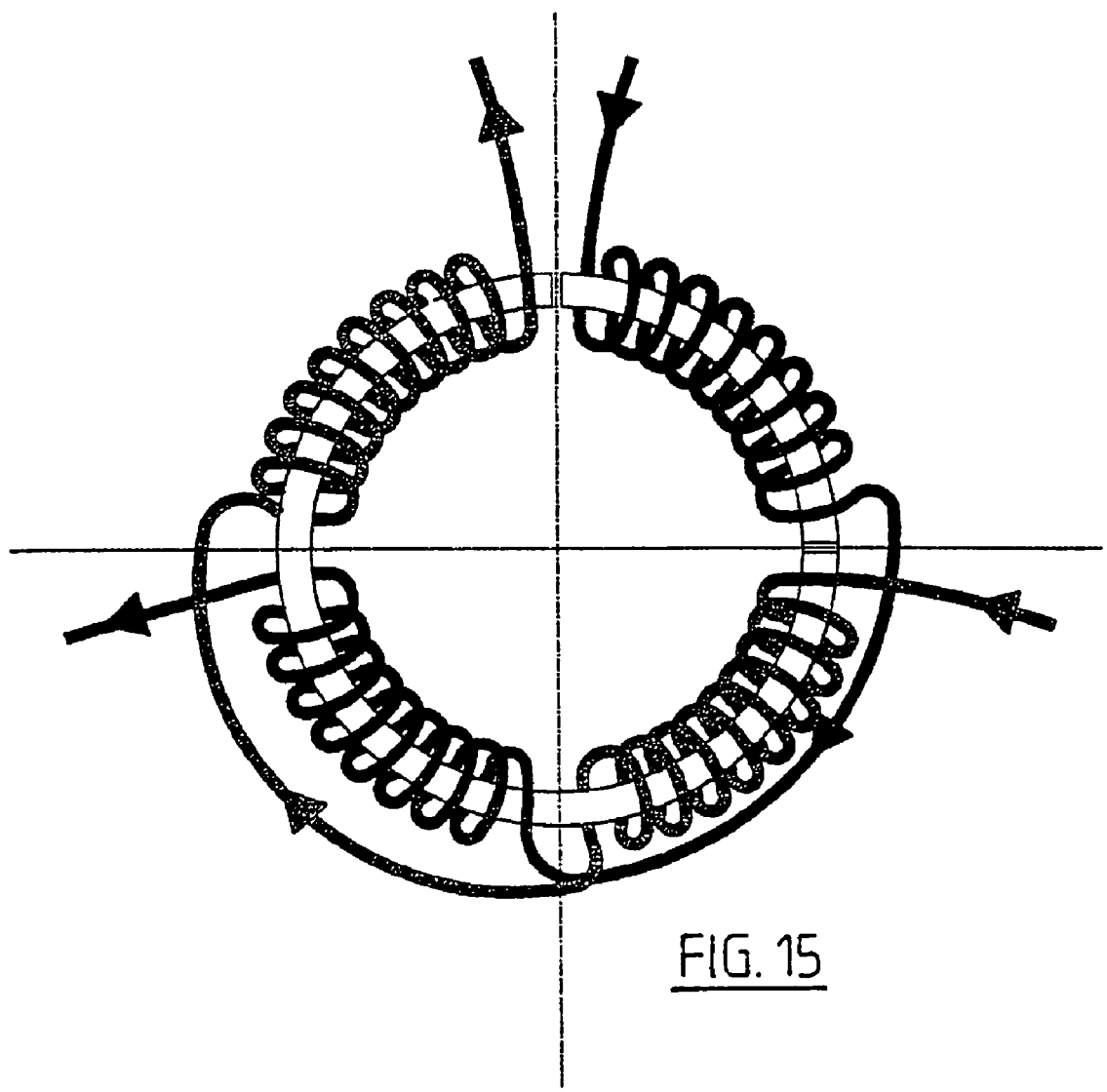
FIG. 15 shows a winding pattern for a bobbin-less version of the stator.

In this configuration (shown in FIG. 15), the stator for a drum (or a disk motor) is produced by winding loops or coils onto an elongate curved ferromagnetic support (by using a transformer-winding machine). Alternatively the support as shown in FIG. 15 can be a split ring so that the winding lops can be threaded onto the ring and the ring closed. Or the ring can be made up of separate curved segments that can be joined together to hold the windings in place. This drawing shows 2 winding phases made up of a total of 4 segments.

Advantages

The invention lends itself to the simple and easy construction of stator windings with the coils oriented at 90° to the conventional coil layout. This also allows for the use of a preferred method of winding the coils onto bobbins as described in the example.

Variations

It is possible to produce the stator windings for dynamoelectric machines of different configurations, by producing the windings on a former, preferably a straight former, without using bobbins, then transferring the windings so formed onto the appropriate ferromagnetic stator core, for example the drum shaped core of FIGS. 4–7, or the ring shaped core of FIGS. 13, 14 of the disk motor. In the embodiments that use a ring shaped core that has a split or gap in the core it has been found desirable to split the core at an angle such as to cover a whole pole in order to minimise the cogging effects of the split or gap in the core and thus lower acoustic noise during motor operation.

It is also possible to wind the coils directly onto the ferromagnetic core. The core can either be a full circle or one or more arc segments. Winding directly onto a full circle core can be achieved by spinning the segments or moving the winding tip around the segments. Winding directly onto a full circle core can be achieved using methods developed for the winding of toroidal transformers.

However, it is particularly preferred that the windings take place on a series of specially shaped bobbins, as this assists holding the windings in place. Without bobbins, it may be necessary to impregnate the windings with appropriate resins, or other bonding agents, when they have been satisfactorily placed on the ferromagnetic core of the stator.

Motors of various sizes or shapes may be created by the use of the winding technique of this invention.

Although not illustrated, this technique can be used with a double rotor disk motor (i.e. a rotor on either face of the stator of FIG. 14).

In its most preferred form, the invention lends itself to a drum motor having both internal and external rotors.

Finally, various other alterations and modifications may be made to the foregoing without departing from the scope of this invention.

What we claim is:

1. A stator for a dynamoelectric machine, comprising a plurality of annular winding coils arranged on a common curved axis, wherein the common axis is in the direction of a force generated by the windings, and having an annular ferromagnetic core passing through the center of the coils,
    wherein the ferromagnetic core is split at a single point to allow placing the winding coils on the ferromagnetic core but subsequently pushed together to maintain the split substantially closed when the stator is in operation, and
    wherein the split is angled with respect to the common curved axis so as to cover a whole pole.

2. The stator as claimed in claim 1, wherein the ferromagnetic core is in the form of a curved elongate strip.

3. The stator as claimed in claim 2, wherein the ferromagnetic core has a rectangular or substantially rectangular cross-section.

4. The stator as claimed in claim 2, wherein the winding coils are made up of a plurality of annular bobbins slid onto the ferromagnetic core.

5. The stator as claimed in claim 1, wherein the ferromagnetic core comprises a single segment describing the full circle of a rotary machine.

6. The stator as claimed in claim 1, wherein the dynamoelectric machine is a drum based machine.

7. The stator as claimed in claim 1, wherein the dynamoelectric machine is a disk based machine.

8. A method of winding the stator of a toroidally wound dynamoelectric machine comprising:
   providing a ferromagnetic core which is split at a single point to allow placing annular winding coils on the ferromagnetic core, said split being angled with respect to a curved toroid axis of the winding coils so as to cover a whole pole;
   sliding onto the ferromagnetic core a plurality of annular winding coils; and
   forming the ferromagnetic core into an annulus in which the split is substantially closed.

9. The method of winding a stator as claimed in claim 8, wherein the stator winding coils are constructed by producing a required winding layout on a former and transferring the windings so produced onto the ferromagnetic core which makes up or forms part of the stator.

10. The method of winding a stator as claimed in claim 9, wherein the winding layout is slid onto the ferromagnetic core.

11. The method as claimed in claim 8, wherein said winding coils are wound onto a plurality of annular bobbins prior to said step of sliding the winding coils onto the ferromagnetic core.

12. The method as claimed in claim 8, further comprising the step of joining the ferromagnetic core at said split.

13. A stator for a dynamoelectric machine, comprising:
   an annular ferromagnetic core;
   a plurality of annular winding coils wound around said ferromagnetic core and arranged on a common curved axis, said common curved axis is in a direction of a force generated by the winding coils,
   said ferromagnetic core being movable from an open first position with a split at a single point, to a substantially closed second position, said ferromagnetic core being structured and arranged so that said winding coils are placed on the ferromagnetic core in the first position, said split being angled in the direction of the common curved axis and extending over at least one whole pole.

14. A stator as claimed in claim 13, wherein the winding coils are wound on a plurality of annular bobbins that are slid onto the ferromagnetic core when said ferromagnetic core is in said first position.

15. The stator as recited in claim 13, wherein ends of said core abut in said second position.

* * * * *